July 17, 1962 — A. SABLE — 3,044,857
PROCESS OF HYDRATING GRANULATED ALKALINE EARTH METAL OXIDES
Filed May 29, 1961 — 2 Sheets-Sheet 1

INVENTOR.
Andre Sable
BY
HIS ATTORNEYS

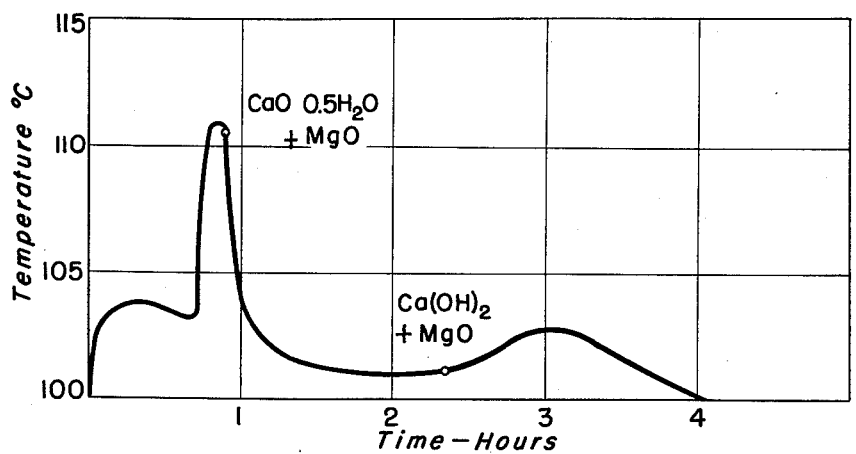
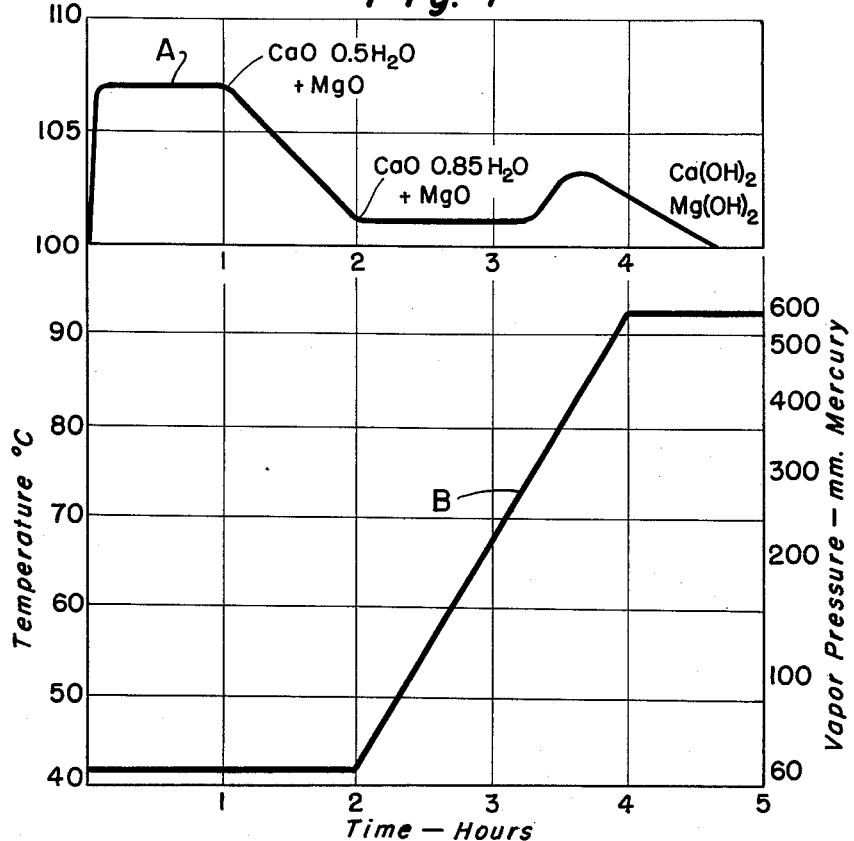

3,044,857
PROCESS OF HYDRATING GRANULATED ALKALINE EARTH METAL OXIDES

Andre Sable, Marseille, France, assignor to Societe d'Electro-Chimie, d'Electro-Metallurgie et des Acieries Electriques d'Ugine, Paris, France, a corporation of France
Filed May 29, 1961, Ser. No. 116,647
Claims priority, application France June 27, 1958
2 Claims. (Cl. 23—188)

This invention relates to a process of hydrating alkaline earth metal oxides in granular form in a manner to avoid substantial bursting of the granular oxides and the resulting formation of pulverulent hydroxides.

This application is a continuation-in-part of my application Serial No. 821,400, filed June 19, 1959, now abandoned.

It is known that the oxides of the common alkaline earth metals (calcium, barium, strontium, magnesium) can be obtained in granular form, for example, by calcining previously crushed carbonates. The hydration of alkaline earth metal oxides comprises a certain number of intermediate hydration stages of different exothermicities, the exothermicities in general decreasing as one approaches complete hydration. Hydration of the oxide is accompanied by swelling, the amount of swelling varying according to which intermediate hydrate is being formed at the time and its rate of formation. In the known hydration processes, the original oxide is subjected to a sudden swelling which destroys its cohesiveness and results in the production of a considerable amount of pulverulent hydroxide.

The process according to the invention enables alkaline earth metal hydroxides to be obtained in a form substantially identical to that of the starting oxides and with the formation of a minimum amount of pulverulent hydroxide. According to the present invention, a mass of the granular oxide is maintained in the state of a fluidized bed by flowing a current of heated gas under pressure through the mass. Water vapor is introduced into the current of heated gas to form moist heated gas which is flowed through the fluidized bed. The fluidized bed is maintained at a temperature sufficient to hydrate the oxide, the temperature of the fluidized bed being at least as high as the temperature at which the water vapor was introduced into the heated gas in order to prevent condensation of water vapor in the fluidized bed. If the water vapor fed to the fluidized bed condenses, it will produce localized spots in the bed having an excess of water, the hydration reaction will proceed so rapidly and the temperature of these localized spots in the bed or the temperature of the whole bed will rise so abruptly that it will cause a sudden swelling of the granules and bursting of them, thereby resulting in the production of pulverulent hydroxide which limits their employment for certain uses.

If, however, according to the present invention, the hydration operation is carried out slowly enough so that each intermediate stage of hydration has sufficient time to complete itself before the next hydration stage occurs, the rate of swelling of the oxide is controlled so that the granules do not burst and do not produce an excessive amount of pulverulent hydroxide.

The rate of hydration which can be tolerated without producing such swelling and bursting of the granules as to produce an excessive amount of pulverulent hydroxide depends upon a number of factors, among which are the particular alkaline earth metal oxide which is being hydrated, its granulation or particle size, the reaction temperature of the fluidized bed, the rate of flow of the moist heated gas through the fluidized bed, and, probably most important of all, the water vapor content of the moist heated gas. The water vapor content of the moist heated gas could be expressed, for example, as grams per cubic meter at a given temperature, but in this application, it is expressed as "water vapor pressure equivalent to X mm. of mercury." Thus, reference to a moist heated gas in which the water vapor pressure is equivalent to 60 mm. of mercury means that the moist heated gas contains a certain amount of water vapor and that moist heated gas in which the water vapor pressure is equivalent to a higher number of millimeters of mercury than X would contain a higher water vapor content.

As has been stated previously, when the hydration of an alkaline earth metal oxide, for example CaO, is carried out slowly enough, it passes through successive intermediate exothermic hydration stages as shown, for example, in FIGURE 2, wherein a curve of the different hydration stages is plotted on a time-temperature diagram. This FIGURE 2 will be referred to more particularly hereinafter, but for the present it is sufficient to say that in accordance with one embodiment of the present invention, one first determines the hydration curve, i.e. the time and temperature at which the different intermediate hydrates form when the hydration process is carried out slowly enough, as, for instance, by employing a moist heated gas having a water vapor pressure equivalent to 60 mm. of mercury. Having thus determined the various hydration stages, one thereafter carries out the hydration under such conditions that the successive intermediate hydration stages remain distinct and do not overlap or intermingle with each other.

Figure 2:
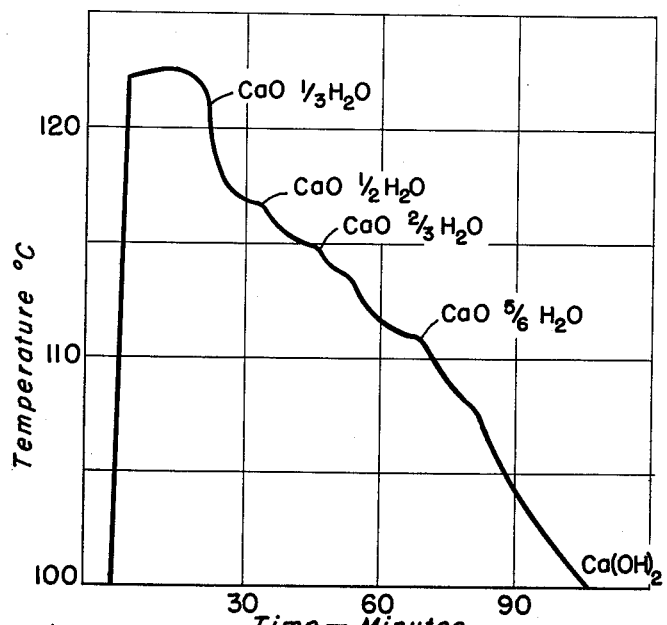
FIGURE 2 is a chart showing the temperature-time relationship of a curve obtained in hydrating lime (CaO), employing a moist heated gas having a water vapor pressure equivalent to 60 mm. of mercury.
Figure 3:
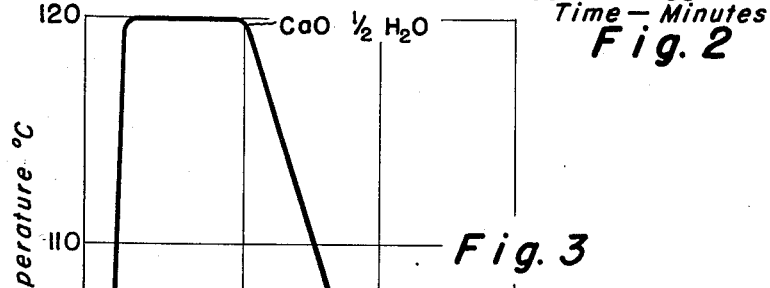
FIGURE 3 is a chart similar to FIGURE 2 but representing the use of a moist heated gas having a water vapor pressure equivalent to 100 mm. of mercury.

FIGURE 4 is a chart similar to FIGURES 2 and 3 but illustrating the hydration of dolomite (CaO+MgO) with a moist heated gas having a water vapor pressure equivalent to 100 mm. of mercury; and FIGURE 5 is a chart illustrating the hydration of dolomite according to the invention. In this chart, the left-hand ordinates represent temperatures in ° C., the right-hand ordinates represent water vapor pressure in mm. of mercury and the abscissae represent time in hours. The curve A represents the time-temperature relationship and the curve B the time-water vapor pressure relationship.

Figure 1:
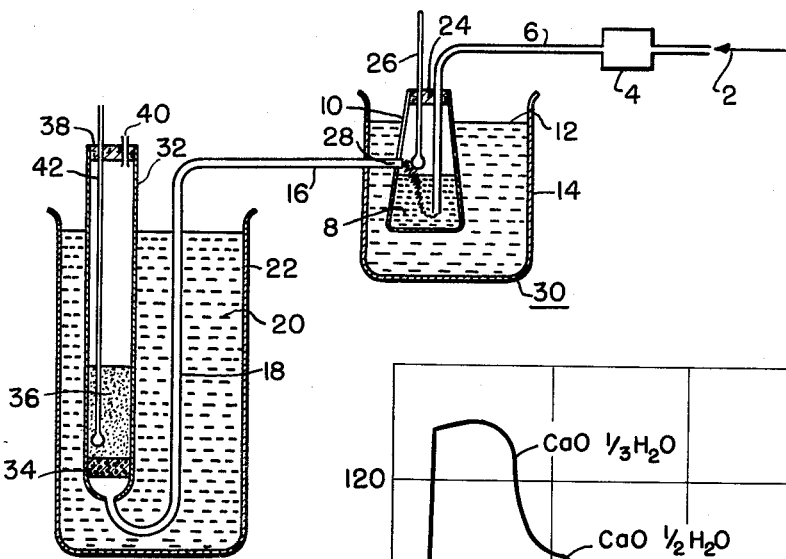
FIGURE 1 illustrates in a diagrammatic manner apparatus suitable for carrying out the process.

Referring now to FIGURE 1, air under pressure from a source 2 flows through a flow meter 4 which can be used to control the flow of the compressed air and then through a pipe 6, the lower end of which dips in a body 8 of water in a flask 10 located in a body 12 of water in a container 14. The body of water 12 can be heated to boiling and the temperature of the water can be regulated by means not shown. The compressed air delivered from the lower end of the pipe 6 bubbles up through the body 8 of water and entrains water vapor in it. The moist heated air so produced flows through a pipe 16 and a pipe 18 immersed in a body 20 of water in a container 22. The water 20 can be heated to boiling and its temperature can be controlled by means not shown. The flask 10 is closed by a plug 24, the pipe 6 extending through a hole in the plug. A thermometer 26 also extends through a hole in the plug 24 and the lower end of the thermometer lies adjacent the outlet 28 of the flask 10 so that the thermometer measures the temperature of the moist heated air leaving the flask 10. The flask 10, pipe 6, body 8 of water and body 12 of water, and container 14, as well as associated parts, constitute a saturator designated generally by the reference numeral 30.

The moist heated air flows from the bottom of pipe 18 into the bottom of a fluidizing tube 32 in which there is a porous plate 34 for uniformly distributing the moist heated gas through a body 36 of the alkaline earth metal oxide in the fluiding tube 32. The upper end of the tube 32 is closed by a stopper 38 which has a vent opening 40. A thermometer 42 extends through an opening in the stopper 38, the lower end of the thermometer being located in the bed or body 36 of alkaline earth metal oxide so as to measure the reaction temperature.

The fluidizing tube 32 may have a diameter of 30 mm. and a height of 250 mm. This tube 32 can be immersed in the same body of water 20 in which the tube 18 is immersed or the tube 32 can be immersed in another liquid having a different boiling point. The fluidizing tube is transparent in order that one can observe the fluidizing of the alkaline earth metal oxide by the moist heated gas under pressure. The fluidizing tube can be separated from the other parts of the device in order to enable one to carry out periodic weighings and in this manner to follow the progress of hydration of the oxide. Also, the physical state of the material being hydrated can be checked, especially its cohesion.

The apparatus permits one to determine, in terms of the operating conditions (fluidizing gas input, temperature of the moist heated air leaving flask 10, and, from suitable tables, the water vapor pressure of the moist heated air leaving flask 10, reaction temperature in the tube 32), the number of phases involved in carrying out the hydration process and the duration of each phase.

The following examples have been carried out in the apparatus shown in FIGURE 1 and will further illustrate the process, it being noted that Example 3 (FIGURE 4) is not according to the invention.

*Example 1*

HYDRATION OF LIME (CaO)

Calcite crystals, crushed and sifted to a granulation of 100–300 microns, were calcined at 1000° C. The calcined product, CaO, was placed in the tube 32 so as to occupy, at rest, 60 mm. in height of the tube. The tube was weighed and then immersed in boiling water 20 in the container 22. Air under pressure was caused to flow through the cold saturator 30 and the air pressure was progressively increased until the mass 36 of CaO in the fluidizing tube 32 was completely fluidized (grains moving along the walls). The fluidizing speed was at that time 25 mm. per second (measured on cold air and on the full section of the tube 32).

Referring now to FIGURE 2, the temperature of the saturator 30 was then progressively increased. At the same time, the temperature of the fluid bed 36 increased up to 120–125° C., which corresponded to a temperature of the saturator of 41–42° C. (corresponding to a water vapor pressure in the flask 10 equivalent to about 60 mm. of mercury). This temperature of the saturator was maintained throughout the remainder of the process. Accordingly, the water vapor pressure of the moist heated air leaving flask 10 was maintained throughout the remainder of the process.

After about 20 minutes at approximately the same temperature level, the fluid bed temperature fell suddenly and then leveled again at 117° C. The weighings then indicated that the fall in temperature had started at a weight corresponding to $CaO\frac{1}{3}H_2O$ and that the end of the leveling corresponded to $CaO\frac{1}{2}H_2O$ after 32 minutes' elapsed time.

The hydration was carried on, still under 60 mm. water vapor pressure. The fluid bed temperature dropped again and then a new level of temperature started at 115° C. That level disappeared after 45 minutes total elapsed time and the weight of the material at that time corresponded to $CaO\frac{2}{3}H_2O$.

After a total elapsed time of 68 minutes, the fluid bed temperature was 111° C. and the weight corresponded to $CaO\frac{5}{6}H_2O$. From this point, the fluid bed temperature dropped progressively and reached 100° C. after a total elapsed time of 105 minutes. The weight now corresponded to $Ca(OH)_2$.

The swelling of the material during hydration occurred principally between the phases corresponding to the compositions $CaO\frac{1}{3}H_2O$ and $CaO\frac{1}{2}H_2O$. It represented 51% of the initial volume, that is, about 13% of the diameter of the individual grains.

The solidity of the obtained material was such that the attrition loss for 105 minutes' fluidization was inappreciable.

*Example 2*

HYDRATION OF LIME (CaO)

Reference is now made to FIGURE 3 representing the course of the hydration process when moist heated air having a water vapor pressure equivalent to 100 mm. of mercury is employed instead of a water vapor pressure equivalent to 60 mm. of mercury as shown in FIGURE 2. During the entire course of the hydration, the body of water 20 in the container 22 was maintained at boiling temperature and the saturator 30 was maintained at about 51° C. As shown in FIGURE 3, the complete hydration of lime is obtained within 85 minutes and the time-temperature curve is simpler than that of FIGURE 2. There is a fall of the temperature when the composition $CaO\frac{1}{2}H_2O$ has been obtained, but there is no fall of the temperature corresponding to the formation of $CaO\frac{1}{3}H_2O$. It is followed by a progressive cooling up to the composition $Ca(OH)_2$ without any abrupt changes in the curve corresponding to the formation of $CaO\frac{2}{3}H_2O$ or $CaO\frac{5}{6}H_2O$. The swelling of the product is considerably greater and the solidity of the product is considerably less than when the method is carried out according to Example 1. The attrition loss in carrying out the process was 2.5%.

When the saturator 30 is operated at a temperature of about 66° C. to produce in flask 10 moist heated air having a water vapor pressure equivalent to 200 mm. of mercury, the hydration of lime occurs without the appearance of any stages of hydration, but in that case, the swelling of the product and the loss of product by attrition is greater.

By comparing Examples 1 and 2, it is seen that the attrition loss in Example 1 was inappreciable, whereas the attrition losses in Example 2 were appreciable. In Example 1, the moist heated air had a water vapor pressure equivalent to 60 mm. of mercury, whereas in Example 2, it had a water vapor pressure equivalent to either 100 or 200 mm. of mercury. Stated otherwise, the water content of the moist heated air used in Example 2 was greater than that in Example 1. In Example 2 the hydration of CaO to the intermediate stages $CaO\frac{1}{3}H_2O$ and $CaO\frac{1}{2}H_2O$ intermingled or overlapped each other so that there was no appearance of the intermediate stage $CaO\frac{1}{3}H_2O$. Likewise, in FIGURE 2, there was overlapping of the intermediate stages $CaO\frac{2}{3}H_2O$ and $CaO\frac{5}{6}H_2O$.

In accordance with one embodiment of the invention, the amount of water vapor in the moist heated gas, i.e. the water vapor pressure of the moist heated gas, which is fed to the fluidized bed is controlled so that each intermediate stage of hydration appears on a time-temperature curve representing stages of hydration. In other words, the amount of water vapor in the moist heated gas is controlled so that the successive intermediate stages of hydration do not overlap each other and do not intermingle.

*Example 3*

HYDRATION OF CALCINED DOLOMITE (CaO+MgO)

Reference is now made to FIGURE 4, this Example 3 not being according to the invention.

A microcrystalline dolomite from La Barasse at Marseille, crushed in polycrystalline conglomerates of 100–280 microns grain size, was calcined at 1000° C.

A sample of that dolomite was fluidized in the tube 32 immersed in a body 20 of boiling water by moist heated air having a water vapor pressure equivalent to 100 mm. of mercury obtained by operating the saturator 30 at about 51° C.

Laboratory trials showed that (see FIGURE 4):

(a) The hydration of CaO and that of MgO is effected successively.

(b) The CaO hydration seems to be made in three phases, the second of which, at about $CaO\frac{1}{2}H_2O$, is most exothermic and is accompanied by almost all of the swelling.

(1) A phase at 100–104° C., probably of adsorption.
(2) A phase at 104–111° C., ending at the $$CaO\frac{1}{2}H_2O+MgO$$

step, characterized, very likely, by a non-controlled reaction of CaO with the water accumulated in the adsorbed form in the course of the preceding phase.

The swelling is then considerable, the final cohesion is bad and the attrition losses are high.

(3) An intermediate phase at 101° C. which requires, in order to obtain hydration of $Ca(OH)_2$ in an adequate time, a rise in the water vapor pressure up to about 250 mm. (which corresponds to a temperature of 72° C. in the saturator).

*Example 4*

HYDRATION OF CALCINED DOLOMITE $(CaO+MgO)$

Reference is now made to FIGURE 5, this Example 4 being according to the invention. I have found that:

(a) At a water vapor pressure equivalent to 60 mm. of mercury, the first two phases merge into one another; there is no previous water accumulation by adsorption, but water vapor is used for the hydration as it is placed at the disposal of the dolomite. The hydration speed is thus controlled.

(b) The hydration of MgO, after the complete transformation of CaO into $Ca(OH)_2$, begins at a water vapor pressure equivalent to about 300 mm. of mercury. Its exothermicity is appreciable for a water vapor pressure equivalent to 400 mm. of mercury.

(c) The total transformation into $Mg(OH)_2$ requires a water vapor pressure equivalent to about 600 mm. of mercury (which corresponds to a temperature of about 94° C. in the saturator).

These test data have led to the following method of operation according to FIGURE 5.

A calcined dolomite sample of 100–280 microns grain size was fluidized by a moist heated air current having a water vapor pressure equivalent to 60 mm. of mercury produced by maintaining the saturator 30 at a temperature of about 41° C. At first, the hydration exothermicity maintained the temperature of the fluid bed at 107° C. for about one hour and then, with the air current still at 60 mm. pressure, the fluid bed temperature lowered progressively to 101° C. so that the temperature was about 101° C. at the end of two hours of operation. At this point in the process, the hydrate $CaO0.85H_2O$ has been formed. Then the water vapor pressure was increased progressively by raising the temperature of the saturator 30 so as to attain a pressure equivalent to 600 mm. of mercury in a period of two hours, at which time the saturator 30 had attained a temperature of about 94° C. The beginning of hydration of MgO was characterized by an increase of the fluid bed temperature up to 103° C. The 600 mm. water vapor pressure was then maintained for one-half hour so as to insure total hydration. The swelling at the end of the process was about 65% in volume, that is, 18% increase in grain diameter. The solidity of the hydrated product was so good that the attrition losses in the fluid bed were about 1.5 to 2.5% after five and one-half hours.

The invention is not limited to the preferred embodiment, but may be otherwise embodied or practiced within the scope of the following claims.

I claim:

1. A process of hydrating calcined dolomite in granular form in a manner to avoid substantial bursting of the granular oxides and the resulting formation of pulverulent hydroxides, which process comprises maintaining a mass of said granules in the state of a fluidized bed by flowing through the mass a current of heated gas containing water vapor but being free from water in the liquid state, and maintaining said fluidized bed at a temperature sufficient to hydrate said oxides, the temperature of said fluidized bed being maintained higher than the dew point of the heated gas in order to prevent condensation of water vapor in the fluidized bed, employing heated gas in which the water vapor pressure is equivalent to about 60 mm. of mercury during the first part of the process while CaO is being partially hydrated, and thereafter progressively increasing the water vapor pressure up to a pressure equivalent to about 600 mm. of mercury to complete the hydration of CaO and to hydrate the MgO.

2. A process of hydrating calcined dolomite in granular form in a manner to avoid substantial bursting of the granular oxides and the resulting formation of pulverulent hydroxides, which process comprises maintaining a mass of said granules in the state of a fluidized bed by flowing through the mass a current of heated gas containing water vapor but being free from water in the liquid state, and maintaining said fluidized bed at a temperature sufficient to hydrate said oxides, the temperature of said fluidized bed being maintained higher than the dew point of the heated gas in order to prevent condensation of water vapor in the fluidized bed, employing heated gas in which the water vapor pressure is equivalent to about 60 mm. of mercury during the first part of the process while CaO is being partially hydrated, and when the hydrate $CaO0.85H_2O$ has been formed, progressively increasing the water vapor pressure up to a pressure equivalent to about 600 mm. of mercury to complete the hydration of CaO and to hydrate the MgO.

References Cited in the file of this patent

UNITED STATES PATENTS 2,611,683    Knibbs _____ Sept. 23, 1952

FOREIGN PATENTS 541,849    Canada _____ June 4, 1957